(12) United States Patent
Yeung

(10) Patent No.: US 7,105,193 B2
(45) Date of Patent: Sep. 12, 2006

(54) PROCESS FOR MAKING A SILICONE MOLD AND BAKING A FOOD PRODUCT THEREIN

(76) Inventor: Ricky K. C. Yeung, 1203, 12/F. Working View Commerical Building, 21 Yiu Wa Street, Causeway Bay (HK)

( * ) Notice: Subject to any disclaimer, the term of this patent is extended or adjusted under 35 U.S.C. 154(b) by 0 days.

(21) Appl. No.: 09/929,271

(22) Filed: Aug. 15, 2001

(65) Prior Publication Data

US 2003/0035873 A1    Feb. 20, 2003

(51) Int. Cl.
  *A23G 3/00*   (2006.01)
  *A23P 1/00*   (2006.01)
  *B29C 33/40*  (2006.01)
  *B29C 71/00*  (2006.01)
  *C08F 6/00*   (2006.01)

(52) U.S. Cl. .................. 426/512; 264/219; 264/232; 264/233; 264/236; 264/331.11; 264/347; 426/523; 528/24; 528/489; 528/499

(58) Field of Classification Search ................ 426/496, 426/505, 523, 512; 264/219, 331.11, 232, 264/236, 233, 344, 345, 347; 528/24, 489, 528/499; 428/447

See application file for complete search history.

(56) References Cited

U.S. PATENT DOCUMENTS

| 2,834,753 | A | * | 5/1958 | Hammersfahr et al. | |
| 3,310,521 | A | * | 3/1967 | White et al. | 524/588 |
| 4,690,967 | A | * | 9/1987 | LaGarde et al. | 524/266 |
| 4,929,460 | A | * | 5/1990 | Lagarde et al. | 426/420 |
| 5,232,609 | A | * | 8/1993 | Badinier et al. | 249/102 |
| 6,063,894 | A | * | 5/2000 | Phipps et al. | 528/916 |
| 6,197,359 | B1 | * | 3/2001 | Llorente Hompanera | 426/523 |

FOREIGN PATENT DOCUMENTS

| GB | 1159021 | * | 7/1969 |
| JP | 73014145 | * | 10/1968 |
| WO | WO 9940794 A1 | * | 8/1999 |

* cited by examiner

*Primary Examiner*—Arthur L. Corbin
(74) *Attorney, Agent, or Firm*—Stephen E. FeldmanP.C.

(57) ABSTRACT

The present invention relates to a process for baking a food product utilizing a confectionery mould made from silicone. The confectionery mould is obtained by mixing and reacting a crosslinkable silicone, especially methyl-vinyl siloxane (VMQ), and a peroxide as a cross-linking agent.

9 Claims, No Drawings

PROCESS FOR MAKING A SILICONE MOLD AND BAKING A FOOD PRODUCT THEREIN

FIELD OF THE INVENTION

The present invention relates to a process for baking a food product. In particular, this invention relates to a process for baking a food product utilizing a confectionery mould made from silicone.

BACKGROUND OF THE INVENTION

U.S. Pat. No. 6,197,359 discloses a method by cross-linking methyl-vinyl polysiloxane as a heat-curable elastomer with a hydrogen-containing silicone oil in the presence of a Pt catalyst to prepare confectionery moulds and baking receptacles. However, platinum catalysts used in the disclosed methods in the prior art are high in cost, great in hazard, short in retention period so as to be preserved under a refrigeration condition, and only about one month of storage life.

In order to solve the aforesaid problems in the prior art, the inventors have worked on these problems in a deep-going way, and found that the aforesaid problems can be solved by using a peroxide as a cross-linking agent. Therefore, the present invention has been completed based upon this discovery.

SUMMARY OF THE INVENTION

An object of the present invention is to provide a process for baking a food product utilizing a confectionery mould made from silicone.

Surprisingly, a confectionery mould, which is cheap in cost, better in performance and nontoxic, is obtained in the present invention by mixing and reacting a silicone material available from market with a cross-linking agent. The mould according to the invention is useful for applications in contact with foodstuffs due to its nontoxicity. The process of baking a food product according to the subject invention comprises the steps of:

preparing a flexible and foldable mould, said mould being formed essentially by a silicone elastomer material, and said silicone elastomer material being obtained by cross-linking the silicone in the presence of a peroxide as a cross-linking agent;

placing a food product to be baked into said mould;

placing the mould containing the food product to be baked in a bake oven at a baking temperature, keeping the baking temperature for a predetermined period of time till the food product has been baked;

taking out the mould containing the baked food product from the bake oven; and taking out the baked food product from mould.

DETAILED DESCRIPTION OF THE INVENTION

The present invention relates to a process for baking a food product utilizing a confectionery mould made from silicone.

The materials for preparing the confectionery mould are a crosslinkable silicone and a crosslinking agent. Said crosslinkable silicone is preferably dimethyl-vinyl siloxane (VMQ) silicone gum with a polymerization degree of 7000–8000.

The cross-linking agent used is a peroxide. Said peroxide includes benzoyl peroxide, bis-(2,4-dichlorobenzoyl) peroxide, dicumyl peroxide, di-tert-butyl peroxide, sym-chlorobutyl peroxide, 2,5-dimethyl-2,5-di-tert-butylperoxy hexane, di-tert-butylperoxy peroxide, 2,5-dimethyl-2,5-bis(tert-butylper hexane and tert-butyl cumyl peroxide. Preferred cross-linking agent is 2,5-dimethyl-2,5-di-tert-butylperoxy hexane, more preferred cross-linking agent is one of cross-linking agents with a trade name of C-8, C-8A or C-8B, available from market and manufactured by Shin-Etsu Chemical Co., Ltd., Tokyo, Japan. The cross-linking agent used is in amount of 0.3–4 wt %, based on the total weight of other raw materials by weight.

The method for preparing the heat-curable elastomer according to the present invention is as follows:

Reaction Scheme:

dimethyl-vinyl siloxane silicone gum+peroxide→product

The method for preparing the heat-curable elastomer according to the present invention is in particular as follows:

using one of methods as the following to mould a blend of a silicone and a cross-linking agent:

a. compression moulding method—refers to one by using a general oil press, in which moulding is carried out under about 150–220 tons of moulding pressure and at about 120–280° C. of mould locking temperature. The mould locking time is about 200–2000 seconds during filling a prescription and moulding because different yardages of cloth are used for the reaction, b. injection moulding: refers to moulding by using an injection machine under a pressure of 20–200 kg and a temperature of 150–280° C. for a period of time of about 100–1000 seconds, and c. hot air curing: i.e. kneading the materials with a multi-roller, then loading the kneaded blend with a given thickness in a bake oven at a temperature of 100–300° C., and moulding it for 100–600 seconds;

after using one of the aforesaid methods to mould a silicone and a cross-linking agent, baking the moulded product at 180–200° C. for 4–16 hours to obtain a product; and rinsing the above-mentioned product of the present invention with boiling water for 4–16 hours, and then ultrasonic-treating the rinsed product with a marketed three-tank gas phase ultrasonic cleaning machine of Model S&E-3036C under conditions of an ultrasonic frequency of 28 KHZ and an ultrasonic power of 21600 W for 5–30 minutes to obtain a confectionery mould according to the present invention.

As the present invention method is used, the production cost of the confectionery mould can be decreased by 20%, the shelf-life of their raw materials is prolonged much more, and the raw materials can be preserved at a room temperature for an indefinite duration with no need of refrigeration and no risk.

EXAMPLES

Example 1

100 weight parts of dimethyl-vinyl siloxane silicone gum and 2 weight parts of C-8 were press-vulcanized at 165° C. for 10 minutes by using conventional compression moulding method, and then baked at 200° C. for 4 hours. The resultant baked product was rinsed with boiling water for 4 hours, then ultrasonic-treated under ultrasonic wave for 15 minutes to obtain a product of the present invention.

Example 2

100 weight parts of dimethyl-vinyl siloxane silicone gum and 0.5 weight part of C-8A were press-vulcanized at 165° C. for 10 minutes by using conventional compression moulding method, and then baked at 200° C. for 4 hours. The resultant baked product was rinsed with boiling water for 4 hours, then ultrasonic-treated under ultrasonic wave for 15 minutes to obtain a product of the present invention.

Example 3

100 weight parts of dimethyl-vinyl siloxane silicone gum and 1 weight part of C-8B were press-vulcanized at 165° C. for 10 minutes by using conventional compression moulding method, and then baked at 200° C. for 4 hours. The resultant baked product was rinsed with boiling water for 4 hours, then ultrasonic-treated under ultrasonic wave for 15 minutes to obtain a product of the present invention.

Example 4

100 weight parts of dimethyl-vinyl siloxane silicone gum and 3 weight parts of C-8 were press-vulcanized at 165° C. for 5 minutes by using conventional compression moulding method, and then baked at 200° C. for 4 hours. The resultant baked product was rinsed with boiling water for 16 hours, then ultrasonic-treated under ultrasonic wave for 30 minutes to obtain a product of the present invention.

Example 5

100 weight parts of dimethyl-vinyl siloxane silicone gum and 2 weight parts of C-8 were press-vulcanized at 165° C. for 10 minutes by using conventional injection moulding method, and then baked at 200° C. for 4 hours. The resultant baked product was rinsed with boiling water for 10 hours, then ultrasonic-treated under ultrasonic wave for 5 minutes to obtain a product of the present invention.

Example 6

100 weight parts of dimethyl-vinyl siloxane silicone gum and 2 weight parts of C-8 were press-vulcanized at 165° C. for 10 minutes by using conventional hot-blast-air curing method, and then baked at 200° C. for 4 hours. The resultant baked product was rinsed with boiling water for 8 hours, then ultrasonic-treated under ultrasonic wave for 17 minutes to obtain a product of the present invention.

Example 7

100 weight parts of dimethyl-vinyl siloxane silicone gum and 1.5 weight parts of C-8 were press-vulcanized at 155° C. for 10 minutes by using conventional hot-blast-air curing method, and then baked at 200° C. for 4 hours. The resultant baked product was rinsed with boiling water for 5 hours, then ultrasonic-treated under ultrasonic wave for 6 minutes to obtain a product of the present invention.

The object of baking a food product is attainable by placing the already formulated raw material of a confectionery into/onto the mould according to the instant invention and heat forming the same.

The silicone rubber mould according to the invention has good releasability, and is useful for complicated articles, easy to store whilst saving storage space and convenient to take for travelers due to elasticity of rubber. On the other hand, one drawback of the silicone rubber conventionally manufactured employing a peroxide is that it has peculiar smell, whereas, in the subject invention, the aforesaid peculiar smell can be removed by rinsing with boiling water and then ultrasonic washing.

What is claimed is:

1. A process for producing a silicone mould useful for baking a food product comprising the steps of:
   (a) preparing a flexible and foldable mould, said mould being formed essentially from 100 weight parts of a heat curable silicone elastomer material and cross-linking said silicone elastomer in the presence of about 0.5 to 2.0 weight parts of a peroxide;
   (b) baking said mould at an elevated temperature for a period of time sufficient to obtain a flexible and foldable mould product;
   (c) rinsing said baked mould with boiling water for a period of time sufficient to remove the odor of the peroxide therefrom; and,
   (d) cleaning said rinsed mould by exposing it to ultrasonic treatment.

2. The process as claimed in claim 1 wherein the rinsing with boiling water is conducted for from 4 to 16 hours.

3. The process as claimed in claim 1 wherein the ultrasonic treatment is conducted for from 5 to 30 minutes.

4. The process as claimed in claim 1 wherein the silicone elastomer material is a heat-curable silicone elastomer of the type intended for applications in contact with foodstuffs.

5. The process as claimed in claim 1 wherein the silicone elastomer contains methyl-vinyl polysiloxane.

6. The process as claimed in claim 1 wherein the peroxide is selected from the group consisting of benzoyl peroxide, bis-(2,4-dichlorobenzoyl) peroxide, dicumyl peroxide, di-tert-butyl peroxide, sym-chlorobutyl peroxide, 2,5-dimethyl-2,5-di-tert-butylperoxy hexane, di-tert-butylperoxy peroxide, 2,5-dimethyl-2,5-bis(tert-butylpero-xy) hexane and tert-butyl cumyl peroxide.

7. The process as claimed in claim 1 wherein the peroxide is 2,5-dimethyl-2,5-di-tert-butylperoxy hexane.

8. The process as claimed in claim 1 wherein the peroxide used is in amount of 0.3–4 wt %, based on the total weight of other raw materials.

9. The process as claimed in claim 1 that further includes:
   (e) placing a food product to be baked into said mould;
   (f) placing said mould containing said food product into a baking oven, said baking oven being at a baking temperature;
   (g) maintaining said baking temperature for a period of time sufficient to bake said food product;
   (h) removing said mould containing said baked food product from said oven; and,
   (i) removing said baked food product from said mould.

* * * * *